(12) United States Patent  (10) Patent No.: US 6,719,654 B2
Deichl et al.                (45) Date of Patent:    Apr. 13, 2004

(54) POWER TRAIN OF A MOTOR VEHICLE

(75) Inventors: Tilo Deichl, Leonberg (DE); Tilo Schweers, Pforzheim (DE); Tobias Ostertag, Leonberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/989,690

(22) Filed: Nov. 21, 2001

(65) Prior Publication Data

US 2002/0065163 A1 May 30, 2002

(30) Foreign Application Priority Data

Nov. 23, 2000 (DE) .......................................... 100 58 020

(51) Int. Cl.[7] .................................................. B60K 6/02
(52) U.S. Cl. ................................ 475/5; 475/9; 475/150; 180/65.2
(58) Field of Search .............................. 180/65.2, 65.4; 475/5, 9, 150, 200

(56) References Cited

U.S. PATENT DOCUMENTS

| 5,337,848 A | * | 8/1994 | Bader ........................ 180/65.2 |
| 5,697,466 A | * | 12/1997 | Moroto et al. ............. 180/65.2 |
| 5,713,425 A | * | 2/1998 | Buschhaus et al. ........ 180/65.2 |
| 5,773,904 A | * | 6/1998 | Schiebold et al. ......... 180/65.2 |
| 5,823,281 A | * | 10/1998 | Yamaguchi et al. ....... 180/65.2 |
| 6,359,404 B1 | * | 3/2002 | Sugiyama et al. .......... 318/432 |
| 2001/0042647 A1 | * | 11/2001 | Sakamoto et al. ......... 180/65.2 |

FOREIGN PATENT DOCUMENTS

| EP | 1068978 A1 | * | 1/2001 |
| WO | WO 98/31559 | | 7/1988 |

* cited by examiner

Primary Examiner—Ankur Parekh
(74) Attorney, Agent, or Firm—Crowell & Moring LLP

(57) ABSTRACT

An electric drive is complementary to an internal combustion engine of a motor vehicle with a drive train having a differential and an electric motor 6 integrated into the drive train. A main shaft of the electric motor is connected directly to a gear ring of the differential in a positive and/or non-positive manner.

4 Claims, 3 Drawing Sheets

POWER TRAIN OF A MOTOR VEHICLE

BACKGROUND OF THE INVENTION

This application claims the priority of German Patent Document 100 58 020.3, filed Nov. 23, 2000, the disclosure of which is expressly incorporated by reference herein.

The present invention concerns an internal combustion engine of a motor vehicle with a drive train containing a differential and an electric motor integrated in the drive train.

A hybrid power train system to complement an internal combustion engine for a motor vehicle is disclosed in WO 98/31559. The motor is assigned a drive for transmitting a driving torque to one driven wheel, gear change apparatus for producing stepped changes in the drive ratio between the input side on the motor and the output side towards the drive, and an electric motor for supplying the driving torque. Regulating and control units are also provided to compensate for a temporary reduction in the magnitude of the driving torque transmitted from the internal combustion engine by connecting the electric motor. The electric motor is directly connected with the cardan shaft via a clutch. An arrangement of the electric motor in a different place than the one shown is not indicated.

SUMMARY OF THE INVENTION

An object of the present invention is to configure and arrange an electric drive in such a way that a simple and cost-effective integration of the electric motor into the power flow of the wheel drive is guaranteed.

This object is attained in accordance with the present invention in that a main shaft of the electric motor is directly connected to gear ring of the differential in a positive and/or non-positive way. This allows the integration of an additional electric drive while completely maintaining the assembly consisting of internal combustion engine, clutch, and gearbox, particularly for two-wheel drive vehicles. Design modifications on the internal combustion engine, clutch, or gearbox are avoided in this way. It is only necessary to couple the electric motor to the gear ring or a driving element of the differential of the drive shaft or the driving wheels.

The integration according to the present invention into already existing wheel drives is relatively simple and inexpensive. In this way, a starting support function, particularly with regard to a start-stop function, a compensation of or addition to the tractive power interruption when shifting the gearbox, a boost function for briefly supporting the driving torque of the internal combustion engine, a recovery of braking energy when coasting or slowing down the vehicle as well as generator operation of the electric motor for charging an energy reservoir are possible even in two-wheel drive vehicles.

For this purpose, it is beneficial to arrange a speed multiplier between the main shaft and the gear ring, wherein the speed multiplier is configured as a positive, non-positive or dynamic transmission. In this way, torque produced by the electric motor can be introduced into the area of its favorable operating point in accordance with the differential speed.

Furthermore, it is beneficial to arrange a clutch between the main shaft and the gear ring, wherein the clutch has a positive and/or non-positive configuration. The electric motor can thus be separated from the drive train. When using a dynamic clutch, it is possible to regulate the ratio of the speeds of the differential and electric motor via the dynamic clutch.

A currently preferred embodiment of the present invention provides for the electric motor to be connected with an energy reservoir and serve as a generator. The existing kinetic energy of the driving vehicle can thus be fed or fed back to the energy reservoir via the generator during a braking process.

It is a particularly important aspect of this invention that the electric motor supplements or replaces a driving torque of the internal combustion engine. On one hand, the shifting process of the gearbox and the associated tractive power interruption of the internal combustion engine can be compensated, and on the other hand the driving power of the electric motor can also be introduced into the drive train at any other operating point.

A currently particularly preferred embodiment of the invention enables a low center of gravity of the entire drive train. This brings along advantages in vehicle dynamics.

Likewise, the electric motor can be integrated into the drive train in the smallest space.

The possibility is created of arranging the drive train in such a way that the heavy components, such as the internal combustion engine and the electric motor, are located in the vehicle center plane.

A particularly preferred development provides for assembling a compact drive train, in which the number of gears is doubled with two gear wheel steps on the differential.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
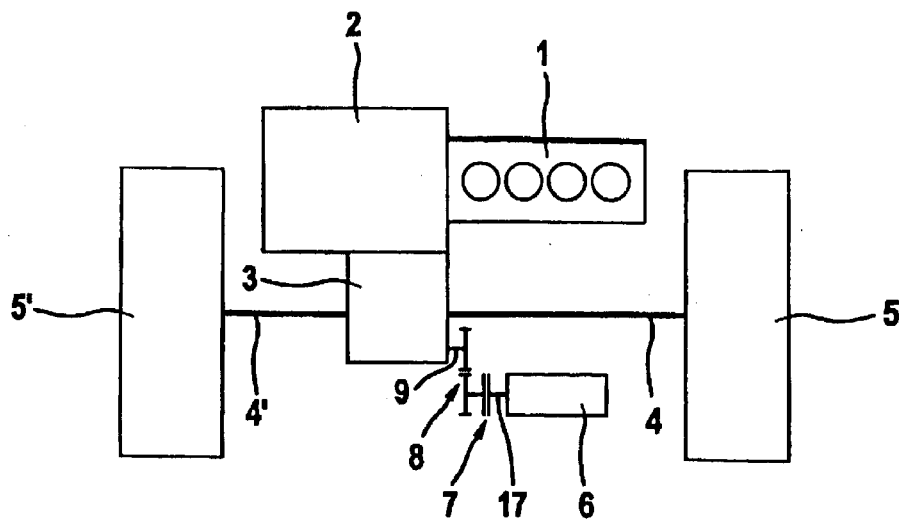
FIG. 1 is a schematic diagram of an internal combustion engine with additional electric motor, in accordance with the present invention.

FIG. 1 depicts drive train in which an internal combustion engine 1, is connected with a differential 3 via a gearbox 2. The differential 3 is connected to two driving wheels 5, 5' via a wheel or driving axle 4, 4'. In addition to the internal combustion engine 1, an electric motor 6 or a main shaft 17 of the electric motor 6 is connected with the differential 3 via a clutch 7 and a transmission 8.

The transmission 8 has a differential shaft 9, which is directly connected to a bevel or main gear wheel of the differential 3.

The power flow to the differential 3 thus occurs on two different paths. First, a driving torque 11 generated by the internal combustion engine 1 is transmitted to the differential 3 via the gearbox 2. Second, a complementing torque 12 of the electric motor 6 is transmitted to the differential 3 via the clutch 7, the transmission 8 and the differential shaft 9.

Figure 2:
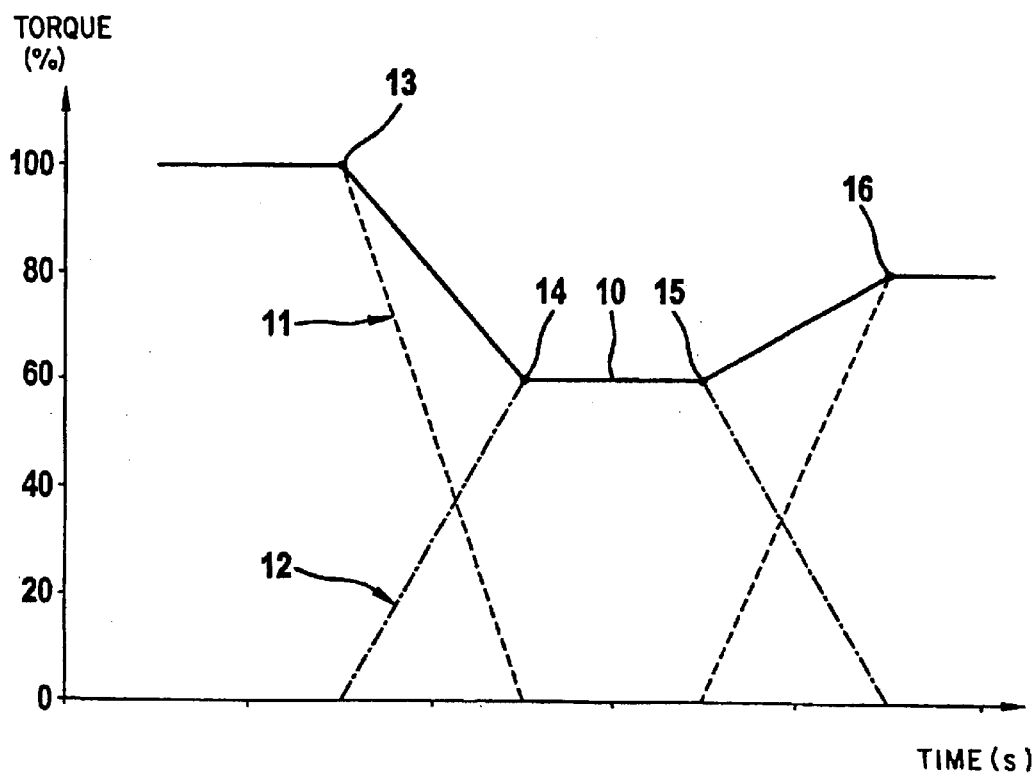
FIG. 2 is a diagram of a torque curve during a shifting process.

In FIG. 2, a torque is identified by reference numeral 10 of the differential 3 or the resulting driving torque of the driving wheels 5, 5' over the period of time. The torque 10 results from the total of the driving torque 11 (shown with dotted lines) of the internal combustion engine 1 and the complementing torque 12 (shown with dash-dotted lines) of the electric motor 6.

At the beginning of a shifting process (point 13), the driving torque 11 transmitted from the internal combustion engine 1 decreases from a starting value of 100% to 0% due to a clutch process initiated in the gearbox 2. The complementing torque 12 of the electric motor 6, which is added or introduced at point 13, increases the torque 10 with a completely engaged clutch at point 14 to 60% of the starting value. When the gearbox 2 of the internal combustion engine 1 is without power, the electric motor 6 generates the resulting complementing torque 12 of 60%. In connection with the layout of the drive, it is also contemplated that the resulting complementing torque 12 is between 50% and 70% or between 40% and 80% of the starting value. A resulting complementing torque 12 of more than 80% up to the replacement driving torque is also contemplated.

As soon as the internal combustion engine 1 in the next higher gear is shifted again into the power flow, the torque 10 increases, starting from point 15, to a final value of 80% of the starting value at a point 16. Between points 15 and 16, the driving torque 11 of the internal combustion engine 1 increases from 0% to 80% in accordance with the engagement process, while the complementing torque 12 of the electric motor 6 drops or is lowered from 60% to 0%.

Adding the electric motor 6 during the start of the shifting process in point 13 therefore has the advantage that the torque 10 of the driving wheels 5, 5' drops only to 60% of the original value through the course of the up-shifting process of the gearbox 2.

Figure 3:
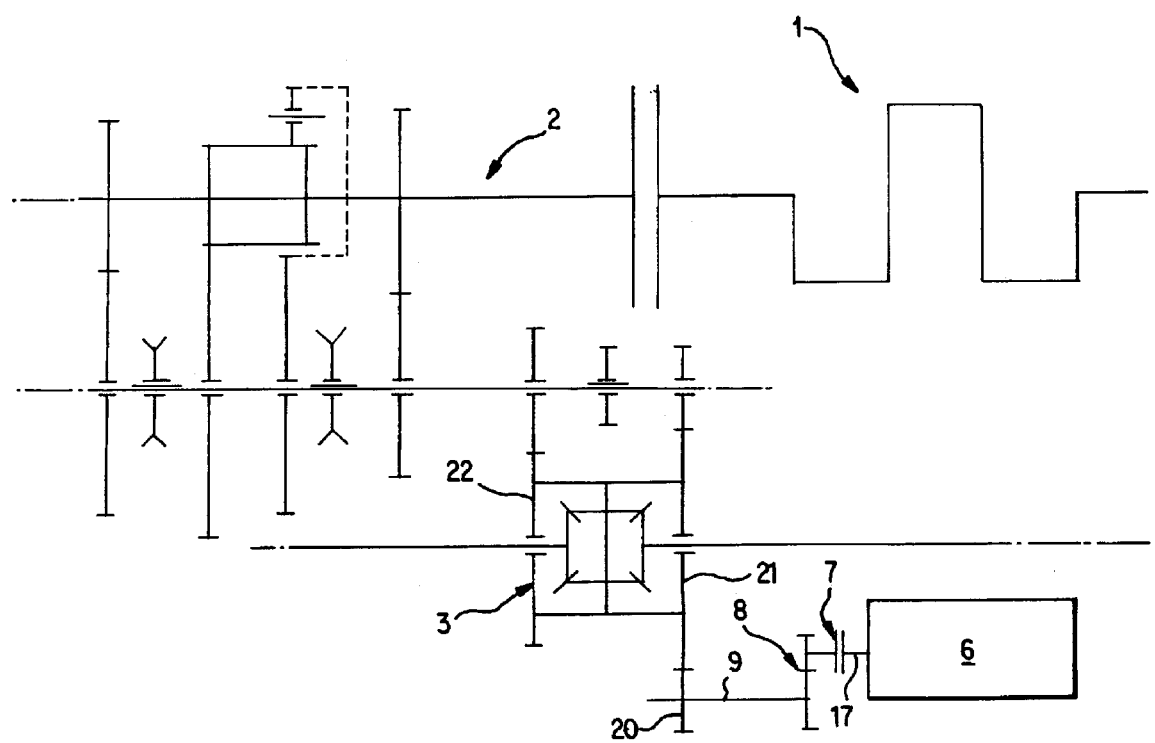
FIG. 3 is a detailed schematic of the drive train of FIG. 1.

FIG. 3 is a more detailed showing of the drive train of FIG. 1. The main shaft 17 of the electric motor 6 is connected via the clutch 7 and the transmission 8, which is configured as a spur gear system, to the differential 3 to transmit torque. For this purpose, a spur pinion 20 of the differential shaft 9 engages with a large spur pinion 21 of the differential 3. This large spur pinion 21, and a small spur pinion 22, are connected in a stationary manner to a differential housing of the differential 3. Both the small spur pinion 22 and the large spur pinion 21, respectively, form a gear wheel step of the gearbox 2.

Figure 4:
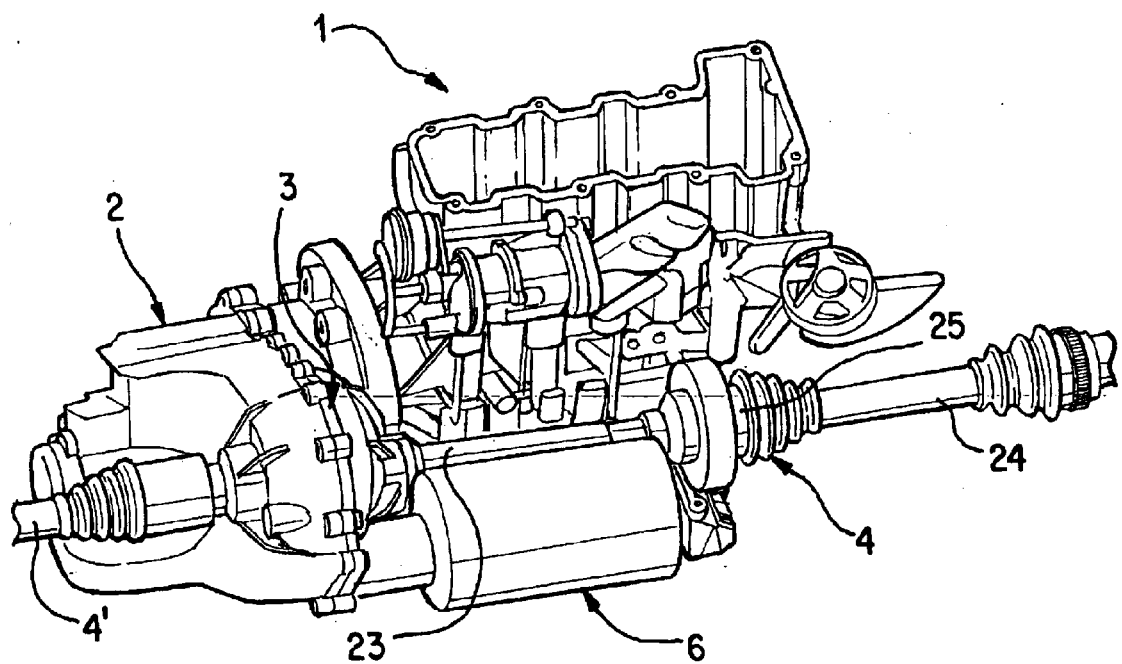
FIG. 4 is a perspective and detailed view of the drive train of FIG. 3.

FIG. 4 is a perspective detailed showing of the drive train of FIG. 3. The depiction is slightly tilted over the actual assembly position of the drive train in the vehicle. In the assembled position, the main shaft 17 of the electric motor 6 is located beneath the driving axle 4, 4' so that the center of gravity of the relatively heavy electric motor 6 is located low.

A first drive shaft of the driving axle 4, 4' comprises a first axle shaft half 23 connected to the differential 3, and a second axle shaft half 24 connected via a joint 25 to the first axle shaft half 23. The electric motor 6 is arranged in a parallel offset manner to the first axle shaft half 23 in an axial area between the differential 3 and the joint 25. In this configuration, the electric motor 6 engages radially with an unused space of the axle shaft half 23 which is rigidly connected to the driving bevel wheels of the differential 3. The joint 25 engages axially with the radial space of the electric motor 6 next to the electric motor 6 to allow an arrangement in the event little space is available.

An axially central area in which the internal combustion engine 1 is located between the two driving wheels 5, 5' (FIG. 1) driven by the drive shaft 4, 4', as well as the first axle shaft half 23 and the electric motor 6. A vehicle center plane is located in this axially central area. The axially central area is located axially on the one drive side of the differential 3, whereas the gearbox 2 is located axially on the other drive side of the differential 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A power train of a motor vehicle having an internal combustion engine, the power train comprising a differential, a driving axle and an integrated electric motor, wherein the electric motor has a main shaft connected directly or via at least one of a transmission and a clutch to a driving part of the differential in at least one of a positive or non-positive manner, and the electric motor is arranged in a parallel offset manner to one drive shaft of the driving axle, wherein the main shaft of the electric motor is located in an installed position beneath a driving axle.

2. The power train according to claim 1, where one drive shaft of the driving axle comprises a first axle shaft half operatively connected to the differential, and a second axle shaft half, which is connected via a joint to the first axle shaft half, and the electric motor arranged in the parallel offset manner to the first axle shaft half is located in an axial area between the differential and the joint.

3. The power train according to claim 2, wherein an axially central area is located between two driving wheels driven by the drive shafts, in which axially central are the engine, as well as the first axle shaft half and the electric motor are arranged, and wherein the axially central area is located on one drive side of the differential, and a transmission is located axially on another drive side of the differential.

4. The power train according to claim 3, wherein the differential has a differential housing connected stationarily with two spur pinions to form a gear wheel step of the transmission.

* * * * *